May 7, 1963  E. L. RALPH  3,089,070
PHOTOELECTRIC CONVERTER OR THE LIKE
Filed Sept. 3, 1957

EUGENE L. RALPH
*INVENTOR.*

BY
HIS ATTORNEY 3,089,070
Patented May 7, 1963

3,089,070
PHOTOELECTRIC CONVERTER OR THE LIKE
Eugene L. Ralph, Skokie, Ill., assignor to Hoffman Electronics Corporation, a corporation of California
Filed Sept. 3, 1957, Ser. No. 681,798
3 Claims. (Cl. 320—2)

This invention relates to improvements in photoelectric converters and, more particularly, to a photoelectric converter for power generation in which an extra rectifying junction is provided to prevent discharge of associated battery equipment when the converter is not illuminated.

With the advent of efficient and relatively low cost photoelectric converters responsive to energy in the solar radiation spectrum, the use of solar energy to power practical devices such as radio communications equipment has become attractive. In such systems it is necessary that the solar energy converter be coupled to a storage battery of some type so that the associated equipment may be operated at any time throughout the twenty-four hour period of a day instead of being operable only during sunlight hours. To charge the storage battery the anode of the photoelectric converter is connected to the anode of the storage battery and the cathode of the generator is connected to the cathode of the storage battery. Thus, without other elements in the circuit, when light ceases to fall upon the photoelectric converter, it ceases to generate electricity and becomes a passive load on the storage battery, its impedance as a load being low because it is operating in the forward direction. The practice in the past has been, therefore, one of placing an external diode in series with the photoelectric converter so as to prevent discharge of the storage battery through the converter in times of no illumination. Such additional components add to the cost of the over-all converter by adding both parts costs and labor costs.

Therefore, it is an object of this invention to provide a photoelectric converter element which inherently prevents discharge of associated battery apparatus when the converter is not illuminated.

It is a further object of this invention to provide a solar energy converter element which will provide current to an associated storage battery during times of illumination but will look like an open circuit to the associated battery equipment during times of no illumination.

According to the present invention, in addition to the photoelectric converting junction there is provided a non-illuminated rectifying junction so poled as to appear as a high resistance to the battery thus preventing discharge of the battery when the photoelectric junction is not illuminated.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 2 is a schematic diagram showing the invention in use in conjunction with a storage battery or the like.

Figure 1:
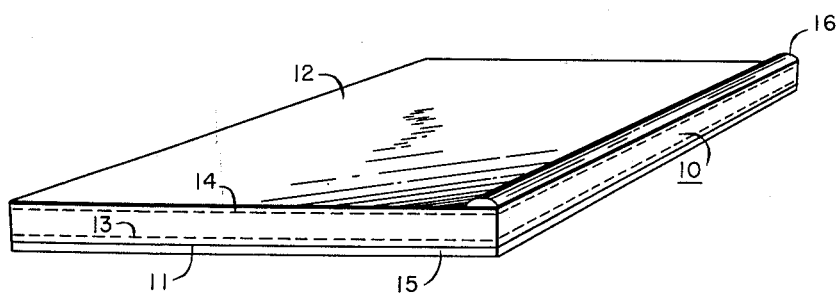
FIGURE 1 is a partially schematic drawing of a photoelectric converter according to this invention.

In FIGURE 1, body 10 is of a semiconductor material of a first type, for example N-type silicon. An electron acceptor material such as boron is diffused into surface 11 and 12 so as to produce two rectifying junctions 13 and 14. Junction 14 is the photoelectric converting junction, surface 12 being exposed for impingement of light energy thereon and junction 13 is a non-illuminated rectifying junction. Positive contact 16 is then applied to surface 12 by first nickel plating and then solder dipping a small region of surface 12. Negative contact 15 is applied to surface 11 by a similar technique. In either case supersonic soldering techniques may be substituted for the plating and solder dipping technique. As has been indicated, purely by way of example, converter element 10 may be basically N-type silicon with boron diffused into surfaces 11 and 12 to provide very thin layers of P-type silicon. It should be noted, however, that other materials may be used for the converter and the present invention will still apply. For example, P silicon may be used for the base material 10 and an electron donor material such as arsenic may be diffused into surfaces 11 and 12 to give N-type silicon. Also other substances such as germanium, silicon carbide, gallium arsenide, and others may be used.

Figure 2:
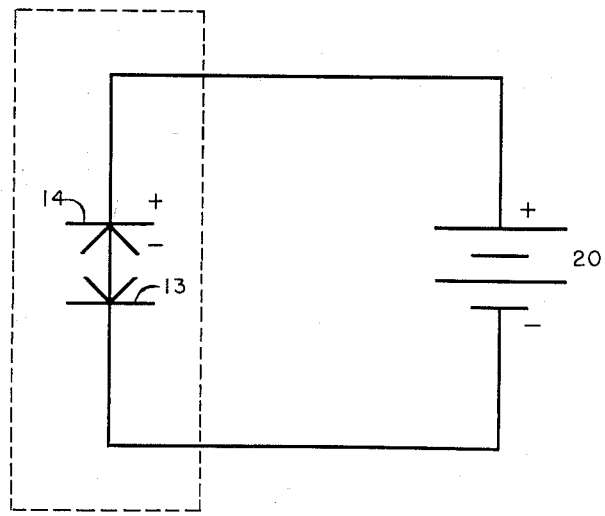

When element 10 is connected in an electrical circuit its electrical characteristics may be symbolized as shown in FIGURE 2. Light impinging upon junction 14 generates a potential with the indicated polarity and with a magnitude exceeding the magnitude of the voltage appearing across battery 20 in order that current may be driven into that battery. Junction 13 presents its forward resistance to current flow from junction 14. Since the forward resistance of a p-n junction is relatively slight, current flows freely to battery 20 through junction 13. When junction 14 is not illuminated, junctions 13 and 14 in series constitute a load across battery 20. By reason of the reversed connection of junction 13 with respect to battery 20 in the circuit, the voltage appearing across junction 13 is reversed and can produce no current flow through junction 13. Thus, battery 20 is prevented from discharging through the combination of junction 13 and junction 14 when junction 14 is not illuminated.

The configuration of converter 10 may be varied from that shown. For example, it may be desirable to use less than the entire surface 11 as part of the rectifying junction. Therefore, rectifying junction 13 may be given a desired characteristic by varying the depth of diffusion into surface 11 and by controlling the area of surface 11.

Thus there has been provided a photoelectric converting device with an inherent ability to prevent the photoelectric junction from forming a low impedance load on an associated battery system when the photoelectric junction is not illuminated.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. An apparatus for converting light energy into electrical energy for the purpose of maintaining a storage battery in charged condition, comprising a photovoltaic cell having a body portion of semiconductor material of a first type, one surface of said body portion having a layer of the opposite conductor type to form a first rectifying junction, said layer adapted for light impingement thereon, another surface of said body portion having a layer of the same semiconductor type as said first mentioned layer to form a second rectifying junction, electrodes for said first and second mentioned layers, a storage battery, and means for connecting said electrodes to said storage battery in such manner that said junctions are in series with said battery; whereby upon cessation of light impingement upon said first mentioned layer, said second junction acts as a high resistance to said battery to prevent discharge of said battery through said photovoltaic cell.

2. An apparatus as set forth in claim 1 in which said semiconductor material forming the body portion is N-type silicon, and said layers are P-type silicon.

3. Apparatus as set forth in claim 1 in which said semiconductor of opposite type is boron-diffused silicon.

References Cited in the file of this patent

UNITED STATES PATENTS

| | | |
|---|---|---|
| 2,402,662 | Ohl | June 25, 1946 |
| 2,582,850 | Rose | Jan. 15, 1952 |
| 2,588,254 | Horovitz et al. | Mar. 4, 1952 |
| 2,669,635 | Pfann | Feb. 16, 1954 |
| 2,689,930 | Hall | Sept. 21, 1954 |
| 2,780,765 | Chapin et al. | Feb. 5, 1957 |